United States Patent
Katta et al.

(10) Patent No.: US 9,501,602 B2
(45) Date of Patent: Nov. 22, 2016

(54) ELECTROMIGRATION-AWARE LAYOUT GENERATION

(71) Applicant: TAIWAN SEMICONDUCTOR MANUFACTURING COMPANY LTD., Hsinchu (TW)

(72) Inventors: Nitesh Katta, Hsinchu (TW); Jerry Chang-Jui Kao, Taipei (TW); Chin-Shen Lin, Taipei (TW); Yi-Chuin Tsai, Pingtung Country (TW); Chou-Kun Lin, Hsin-Chu (TW); Kuo-Nan Yang, Hsinchu (TW); Chung-Hsing Wang, Hsinchu County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 34 days.

(21) Appl. No.: 14/255,325

(22) Filed: Apr. 17, 2014

(65) Prior Publication Data

US 2015/0302128 A1 Oct. 22, 2015

(51) Int. Cl.
*G06F 17/50* (2006.01)
(52) U.S. Cl.
CPC ................................ *G06F 17/5072* (2013.01)
(58) Field of Classification Search
USPC ....................................................... 716/120
See application file for complete search history.

(56) References Cited

U.S. PATENT DOCUMENTS

| | | | | |
|---|---|---|---|---|
| 6,807,660 | B1 * | 10/2004 | Frenkil | 716/109 |
| 2006/0095870 | A1 * | 5/2006 | Tai et al. | 716/1 |
| 2006/0200784 | A1 * | 9/2006 | Ding et al. | 716/6 |

OTHER PUBLICATIONS

Nitesh Katta, U.S. Appl. No. 14/059,332 (not yet published). Application Date Oct. 21, 2013.

* cited by examiner

*Primary Examiner* — Paul Dinh
*Assistant Examiner* — Bryce Aisaka
(74) *Attorney, Agent, or Firm* — WPAT, P.C., Intellectual Property Attorneys; Anthony King

(57) ABSTRACT

In some embodiments, in a method, placement of a design layout is performed. The design layout includes a power rail segment, several upper-level power lines and several cells. The upper-level power lines cross over and bound the power rail segment at where the upper-level power lines intersect with the power rail segment. The cells are powered through the power rail segment. For each cell, a respective current through the power rail segment during a respective SW of the cell is obtained. One or more groups of cells with overlapped SWs are determined. One or more EM usages of the power rail segment by the one or more groups of cells using the respective currents of each group of cells are obtained. The design layout is adjusted when any of the one or more EM usages of the power rail segment causes an EM susceptibility of the power rail segment.

20 Claims, 15 Drawing Sheets

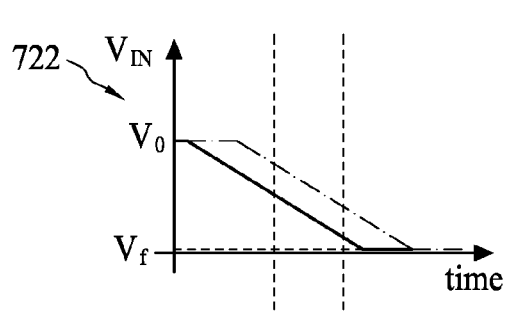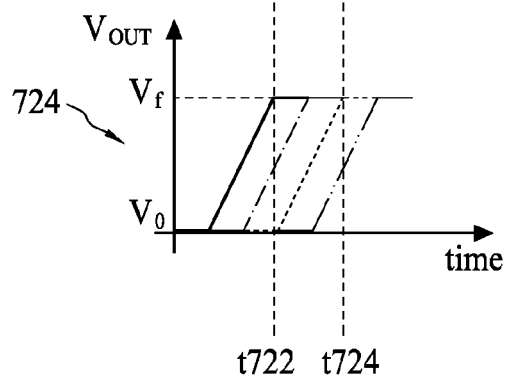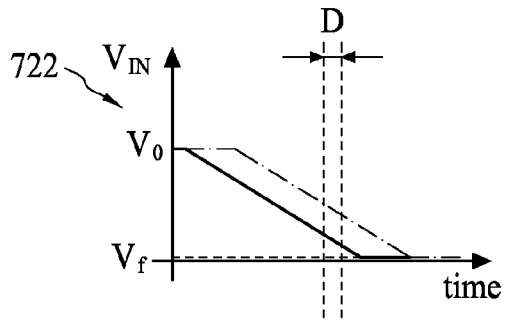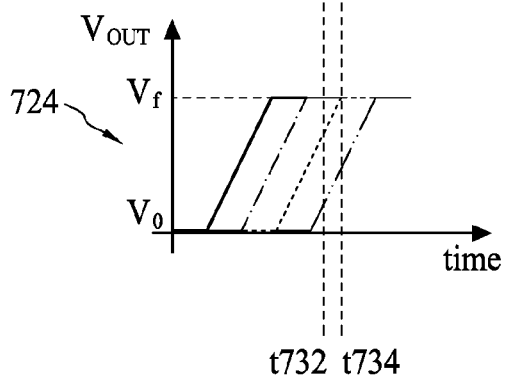
FIG. 7B          FIG. 7C

1102

| Cell | TR |
|---|---|
| $S_1$ | 1 |
| $S_2$ | 0.5 |
| $S_3$ | 0.25 |
| $S_4$ | 0.5 |
| $S_5$ | 0.25 |

1104

| Combinations | Common TR |
|---|---|
| $\{S_1\}$ | 1 |
| ~~$\{S_1,S_2\}$~~<br>~~$\{S_1,S_4\}$~~<br>~~$\{S_2,S_4\}$~~<br>$\{S_1,S_2,S_4\}$ | 0.5 |
| ~~$\{S_1,S_3\}$~~<br>~~$\{S_2,S_3\}$~~<br>•<br>•<br>•<br>$\{S_1,S_2,S_3,S_4,S_5\}$ | 0.25 |

FIG. 11

ELECTROMIGRATION-AWARE LAYOUT GENERATION

BACKGROUND

With the continual scaling of feature size and the ever-expanding functionalities of chips, sizes of wires that connect components in a chip are also reduced, causing current densities through the wires to increase. A life span of a wire is subject to electromigration, which is a material transport caused by transfer of momentum between conducting electrons and metal ions. Electromigration can cause the formation of hillocks or voids in the wire, which can lead to short circuit or open circuit. A mean time to failure (MTTF) of the wire, when estimated taking electromigration into consideration, decreases with the increase of current density.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 7A to 7C are schematic waveform diagrams illustrating definitions of SWs in accordance with different embodiments.

FIG. 11 illustrates results obtained from the operations 1004, 1006, and 1008 in accordance with some embodiments.

DETAILED DESCRIPTION

Figure 1:
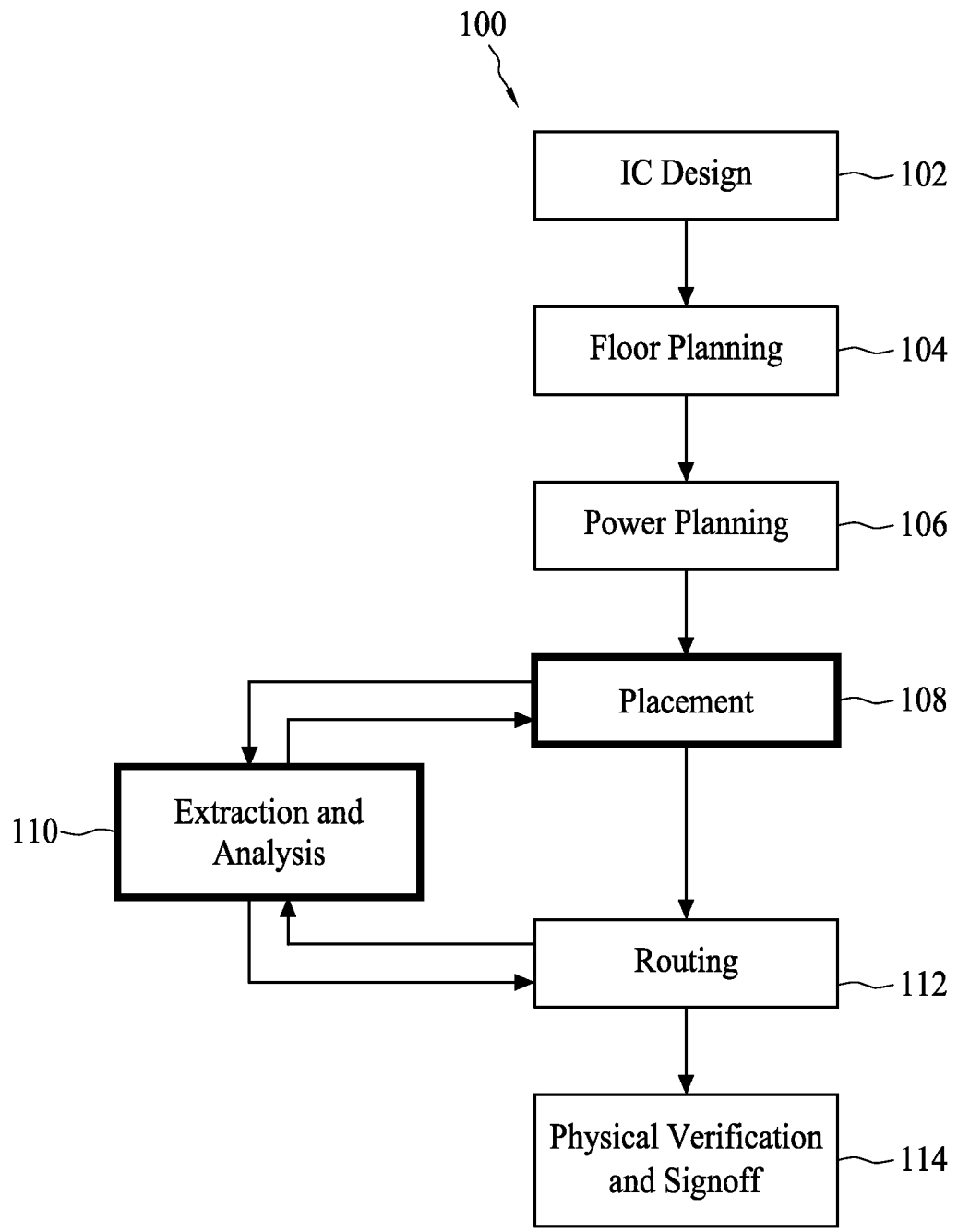
FIG. 1 is a flow diagram of at least a portion of a design flow for an integrated circuit chip in accordance with some embodiments.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper", "lower", "left", "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. It will be understood that when an element is referred to as being "connected to" or "coupled to" another element, it may be directly connected to or coupled to the other element, or intervening elements may be present.

FIG. 1 is a flow diagram of at least a portion of a design flow 100 for an integrated circuit (IC) chip in accordance with some embodiments. The design flow 100 aims at implementing at implementing an IC chip design from a high-level specification to a physical layout which is verified for, for example, functionality, timing and power. The flow 100 utilizes one or more electronic design automation (EDA) tool to carry out one or more stages in the flow 100.

At an IC design stage 102, a high-level design of the IC chip is provided by a circuit designer. In some embodiments, a gate-level netlist is generated through logic synthesis based on the high-level design and gates in the gate-level netlist are mapped to available cells in a standard cell library. The term "netlist" used herein refers to both graphical-based representation such as a schematic and/or a text-based representation of a circuit.

At a floor planning stage 104, the gate-level netlist is partitioned into functional blocks and a floorplan for the functional blocks in a design layout of the IC chip is created.

At a power planning stage 106, power meshes such as a VDD power mesh and a VSS power mesh are routed. The power mesh includes several metal layers. Each metal layer includes power lines or power rails running, for example, horizontally or vertically. The metal layers are stacked such that any adjacent metal layers have the power lines or power rails running in, for example, orthogonal directions.

At a placement stage 108, mapped cells of logic gates and registers in the blocks are placed at specific locations in the design layout. In some embodiments, an initially placed design layout is passed to a parasitic extraction and analysis stage 110 which generates a physical netlist that includes extracted parasitics from the design layout. Timing and/or power analysis are performed on the physical netlist so that information for determining a respective electromigration (EM) usage of each power rail segment by the respective associated cells can be passed back to the placement stage 108. Subsequently, constraints that limit the EM usages of the power rail segments by EM susceptibilities of the power rail segments, respectively, are generated and applied when the placement is optimized for a more EM-aware placement.

At a routing stage 112, interconnects between the placed cells in the design layout are routed. The routed design layout is passed to the parasitic extraction and analysis stage 110 which generates a physical netlist of the design layout, and performs timing analysis on the physical netlist. Based on an analysis result passed back to the routing stage 112, post-route optimization can be performed on the design layout to achieve timing closure of the IC chip design.

At a physical verification and signoff stage 114, layout-versus-schematic (LVS) is performed on a physical netlist generated from the design layout to ensure correspondence of the design layout to the gate-level netlist. Further, design rule check (DRC) is performed on the design layout to ensure the design clean of, for example, electrical issues and lithographic issues for manufacturing. Incremental fixing can be performed to achieve final signoff of the IC chip design before tape-out.

The design flow 100 in FIG. 1 is exemplary. Other sequence of the stages, partition of the stages, and/or additional stages before, between or after the stages shown are within the applicable scope of the present disclosure.

Figure 2:
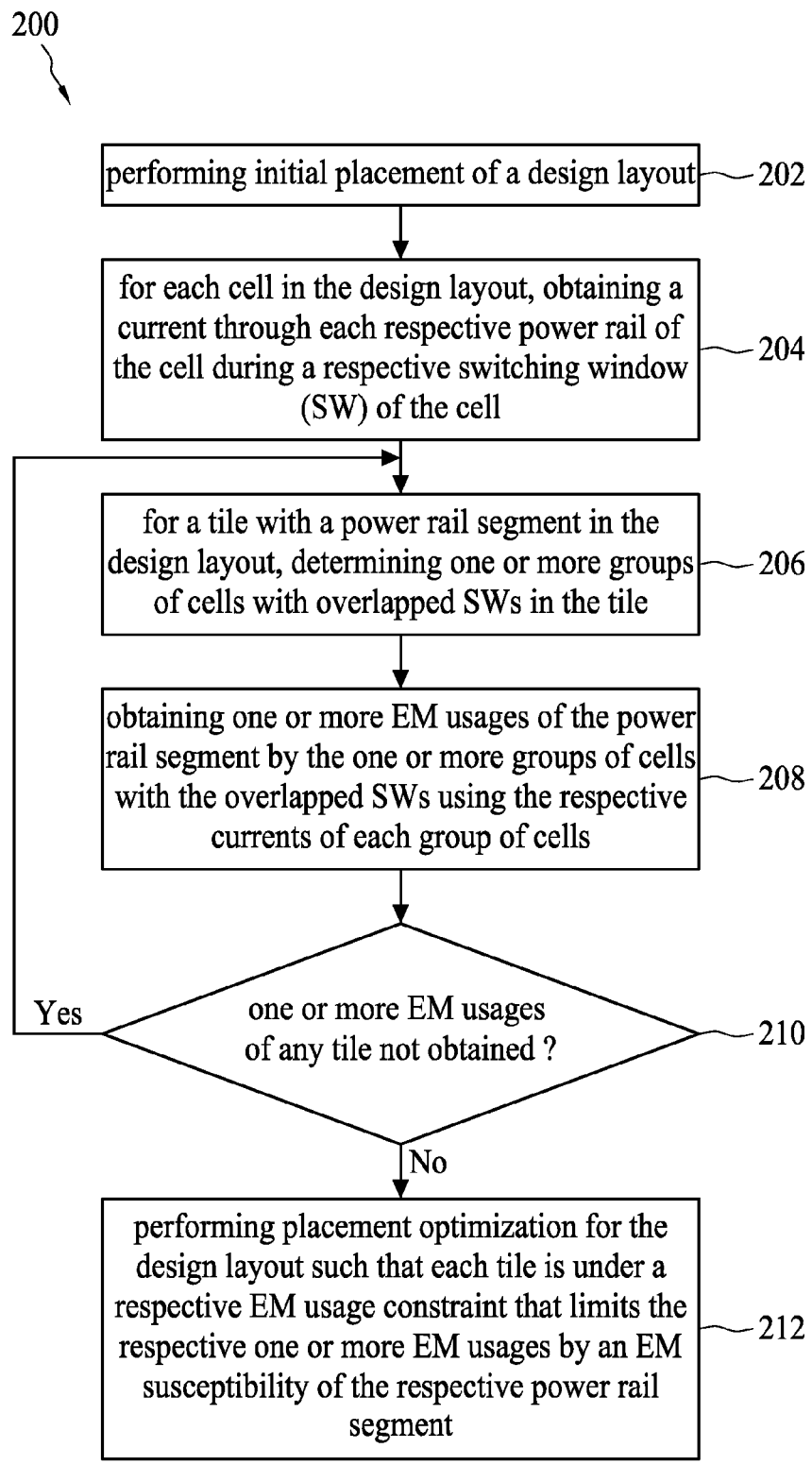
FIG. 2 is a flow diagram of a placement method aware of EM usages of power rail segments in accordance with some embodiments.

FIG. 2 is a flow diagram of a placement method 200 aware of EM usages of power rail segments in accordance with some embodiments. In some embodiments, the method 200 is performed during the placement stage 108 and the parasitic extraction and analysis stage 110. In operation 202, initial placement of a design layout is performed. In operation 204, for each cell in the design layout, a current through each respective power rail of the cell during a respective switching window (SW) of the cell is obtained. In operation 206, for a tile with a power rail segment in the design layout, one or more groups of cells with overlapped SWs in the tile are determined. A tile is a region in the design layout that is bounded by two adjacent VSS or VDD rails on opposite sides of the power rail segment and two adjacent upper-level VDD or VSS power lines crossing over the power rail segment. An exemplary tile for the operation 206 will be described with reference to FIG. 4. In operation 208, one or more EM usages of the power rail segment by the one or more groups of cells with the overlapped SWs in the tile are obtained using the respective currents of each group of cells. In operation 210, if one or more EM usages of any tile are not obtained, the method 200 loops back to the operation 206 to obtain the one or more EM usages of another tile; otherwise, the method proceeds to an operation 212. In operation 212, placement optimization for the design layout is performed such that each tile is under a respective EM usage constraint that limits the respective one or more EM usages by an EM susceptibility of the respective power rail segment. In some embodiments, the operations 206 through 212 are iteratively performed to achieve a more optimized placement for the design layout.

Figure 3:
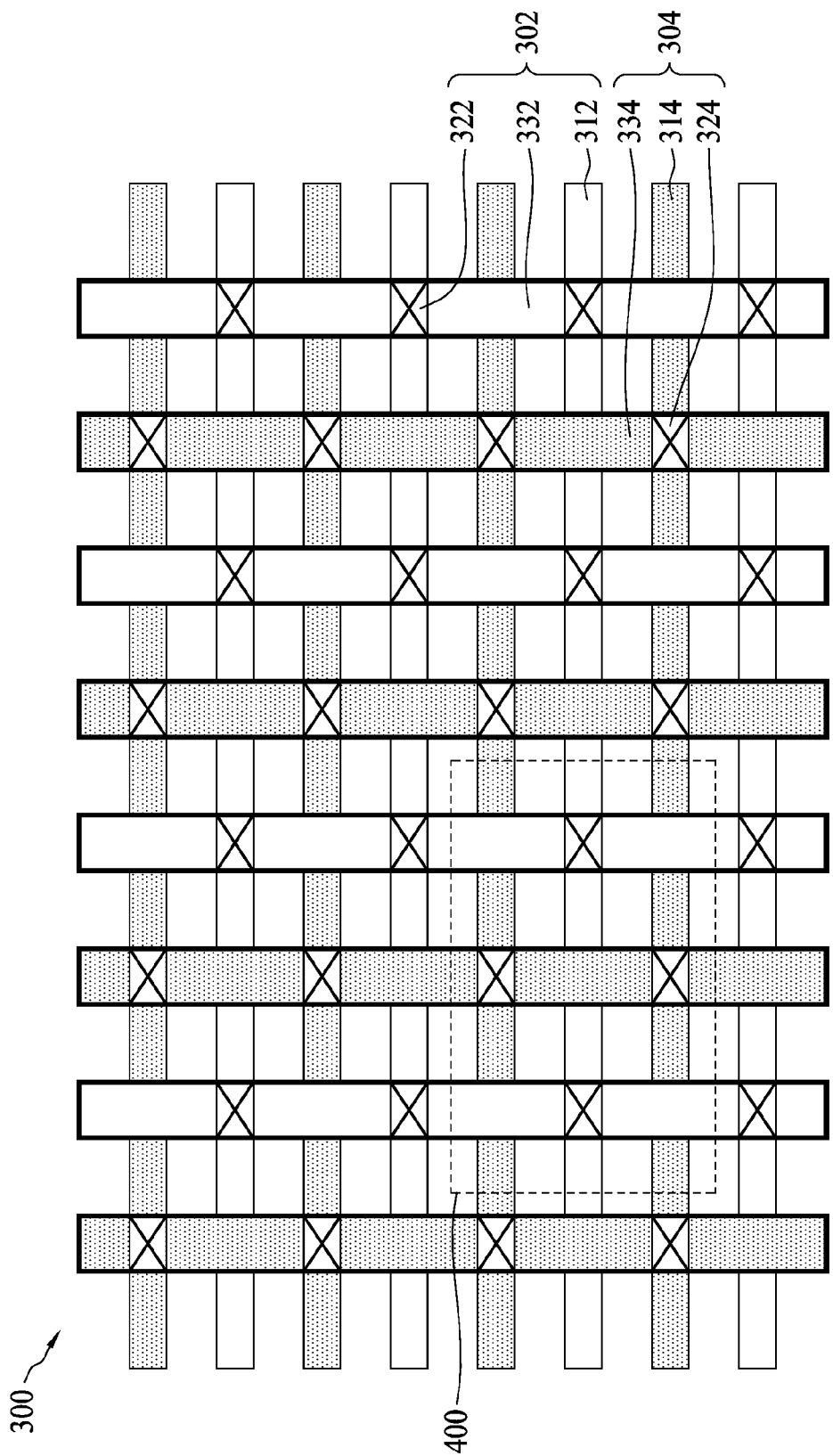
FIG. 3 is a schematic layout diagram of a portion of the design layout generated after initial placement is performed in the placement stage in FIG. 1 in accordance with some embodiments.

FIG. 3 is a schematic layout diagram of a portion of the design layout 300 generated after initial placement is performed in the placement stage 108 in FIG. 1 in accordance with some embodiments. In operation 202 of FIG. 2, initial placement of the design layout 300 is performed. In the power planning stage 106 in FIG. 1, a VDD power mesh 302 and a VSS power mesh 304 are routed. The VDD power mesh 302 includes several VDD power rails 312 in a metal 2 (M2) layer and several VDD power lines 332 in a metal 3 (M3) layer. The VDD power rails 312 are running, for example, horizontally and are spaced in accordance with a pitch for the M2 layer. The VDD power lines 332 are running, for example, vertically and are spaced in accordance with a pitch for the M3 layer. The VDD power lines 332 cross over the VDD power rails 312 and at where the VDD power lines 332 intersect the VDD power rails 312, vias 322 are disposed between the VDD power lines 332 and the VDD power rails 312. The VSS power mesh 304 has a horizontal offset and a vertical offset from the VDD power mesh 302. Similar to the VDD power mesh 302, the VSS power mesh 304 includes several VSS power rails 314 in the M2 layer and several VSS power lines 334 in the M3 layer. The VSS power lines 334 cross over the VSS power rails 314 and at where the VSS power lines 334 and intersect the VSS power rails 314, vias 324 are disposed between the VSS power lines 334 and the VSS power rails 314.

Figure 4:
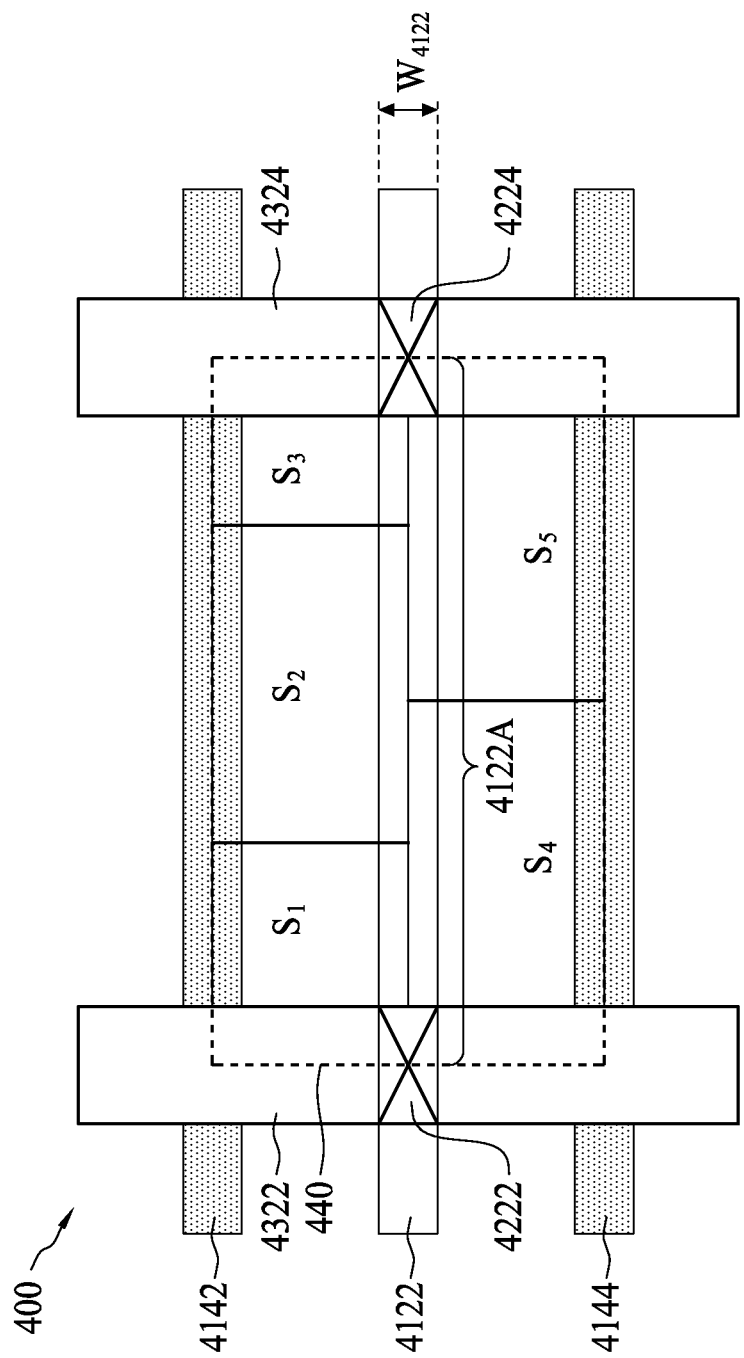
FIG. 4 is a zoomed-in diagram of a portion of the design layout in FIG. 3 in accordance with some embodiments.

FIG. 4 is a zoomed-in diagram of a portion 400 of the design layout 300 in FIG. 3 in accordance with some embodiments. In the portion 400, a VDD power rail 4122 and VSS power rails 4142 running on opposite sides of the VDD power rail 4122 are shown. Further, VDD power lines 4322 and 4324 crossing over the VDD power rail are illustrated. The VDD power rail 4122 is coupled to the VDD power lines 4322 and 4324 through a via 4222 and 4224, respectively. In some embodiments, in the operation 202, standard cells $S_1$, $S_2$ and $S_3$ are placed between the VDD power rail 4122 and the VSS power rail 4142, and standard cells $S_4$ and $S_5$ are placed between the VDD power rail 4122 and the VSS power rail 4144. The standard cells $S_1$, $S_2$ and $S_3$, and the standard cells $S_4$ and $S_5$ are in opposite orientations with respect to the VDD power rail 4122. In some embodiments, the cells $S_1$, $S_2$, . . . , and $S_5$ are configured with power taps (not illustrated) to couple the standard cells $S_1$, $S_2$, . . . , and $S_5$ to the corresponding VDD power rail 4122, and VSS power rails 4142 and 4144. The power taps includes vias.

Figure 5:
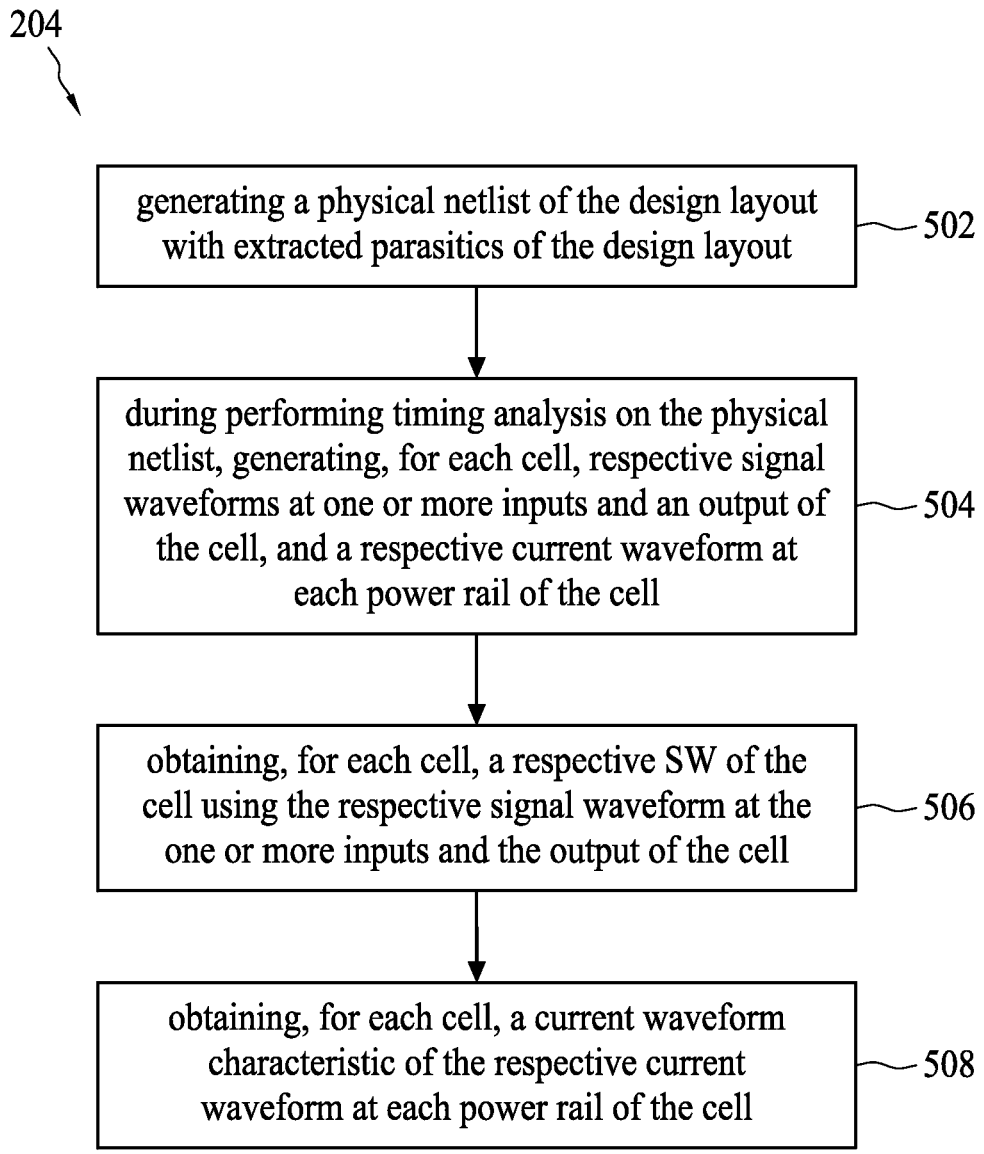
FIG. 5 is a flow diagram of a method implementing the operation 204 in FIG. 2 in accordance with some embodiments.

In operation 204 in FIG. 2, for each cell in the design layout, the current through each respective power rail of the cell during the respective SW of the cell is obtained. FIG. 5 is a flow diagram of a method implementing the operation 204 in FIG. 2 in accordance with some embodiments. In operation 502, a physical netlist of the design layout with extracted parasitics of the design layout is generated. In operation 504, during performing timing analysis on the physical netlist, for each cell, respective signal waveforms at one or more inputs and an output of the cell, and a respective current waveform at each power rail of the cell are generated. In operation 506, for each cell, a respective SW of the cell is obtained using the respective signal waveforms at the one or more inputs and the output of the cell. In some embodiments, in operation 508, for each cell, a current waveform characteristic of the respective current waveform at each power rail of the cell is obtained. In other embodiments, the operation 508 is not performed.

Figure 6:
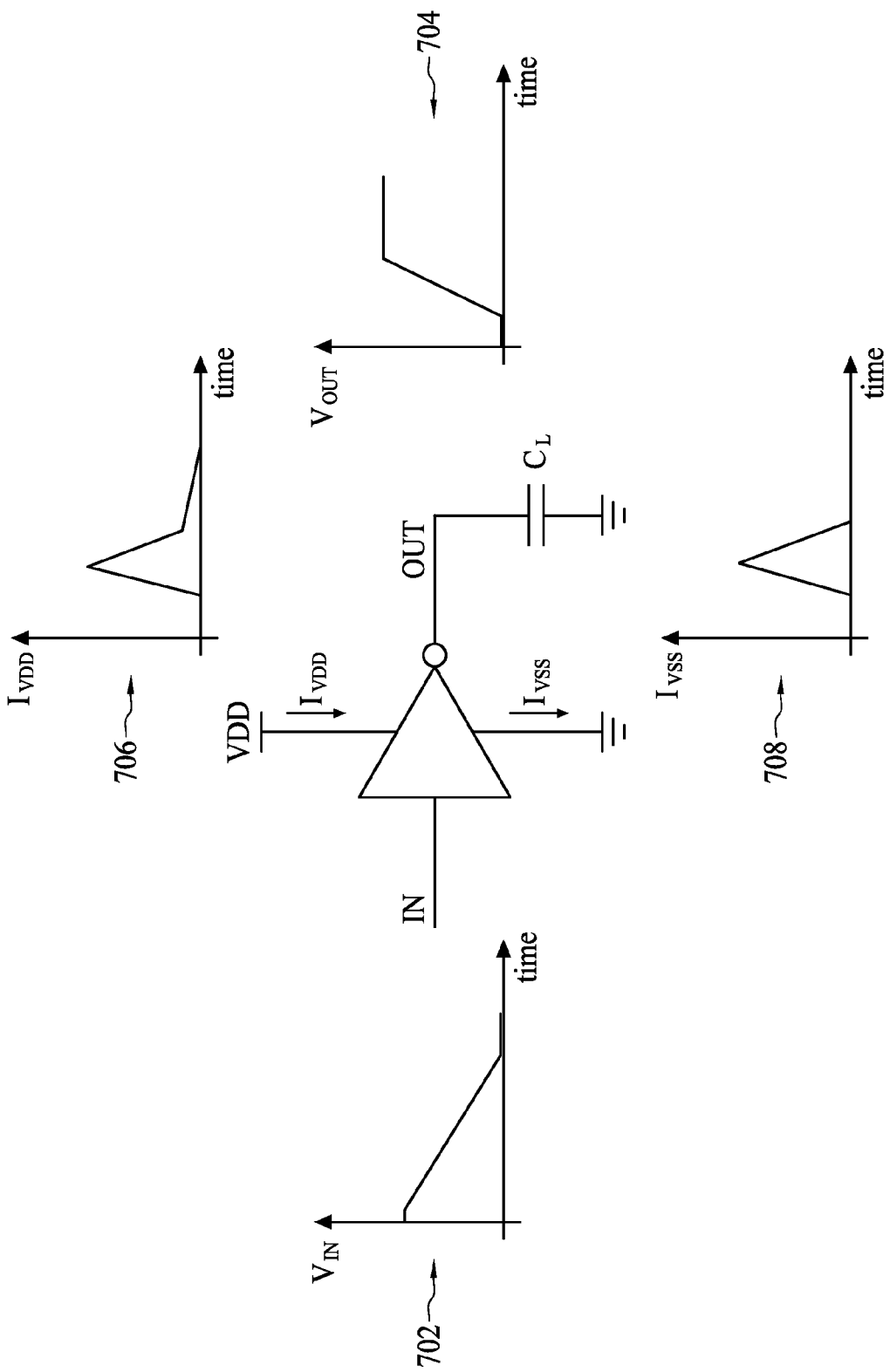
FIG. 6 is a schematic diagram illustrating signal waveforms and current waveforms at terminals of a cell obtained from performing timing analysis in accordance with some embodiments.

FIG. 6 is a schematic diagram illustrating signal waveforms and current waveforms at terminals of a cell 602 obtained from performing timing analysis in accordance with some embodiments. In operation 502 in FIG. 5, a physical netlist of the design layout 300 (shown in FIGS. 3 and 4) with extracted parasitics of the design layout 300 is generated. The physical netlist includes circuit representations of the power meshes, cells coupled to the power rails in the power meshes, and interconnections between the cells. For example, the cell 602 is an inverter in the physical netlist. The cell 602 is represented at a transistor level in the physical netlist and is shown at a gate level in FIG. 6 for simplicity. The terminals of the cell 602 includes an input IN and an output OUT, and power rails VDD and VSS. The cell 602 drives a load that includes, for example, fanout cells of the cell 602 and interconnects between the output OUT of the cell 602 and inputs of the fanout cells. In some embodiments, the load is modeled as a loading capacitor $C_L$ that includes parasitic input capacitance at inputs of the fanout cells and parasitic capacitance of the interconnect. Suppose the cell 602 is driven by another cell, parasitic input capacitance at the input IN of the cell 602 is included into loading capacitance of the other cell. In some embodiments, the parasitic input capacitance at the input IN of the cell 602 includes gate capacitance of transistors in the cell 602. In other embodiments, the parasitic input capacitance at the input IN of the cell 602 includes gate capacitance of transistors in the cell 602, and capacitance of a Miller capacitor (not shown) coupled between the input IN and the output OUT of the cell 602.

Referring still to FIG. 6, in operation 504 in FIG. 5, during performing timing analysis on the physical netlist, for each cell (e.g. cell 602), the respective signal waveforms 702 at one or more inputs IN, and the respective signal waveform 704 at the output OUT of the cell 602 are obtained. The signal waveform 702 is a falling transition of a voltage $V_{IN}$ at the input IN of the cell 602. The signal waveform 704 is a rising transition of a voltage $V_{OUT}$ at the output OUT of the cell 602. A situation where the signal waveform of the voltage $V_{IN}$ is a rising transition and the signal waveform of the voltage $V_{OUT}$ is a falling transition is also analyzed in operation 504 but is not shown for simplicity. A transition time of the signal waveform 702 at the input IN of the cell 602, and the capacitance of the loading capacitor $C_L$ at the output OUT of the cell 602 affects the signal waveform 704 generated at the output OUT of the cell 602. The transition time of the signal waveform 702 is a period during which, for example, 70% of the transition of the voltage $V_{IN}$ from an initial voltage to a steady state voltage is completed. The transition time of the signal waveform 702 is affected by the parasitic input capacitance at the input IN of the cell 602.

Further, in operation 504, a respective current waveform 706 or 708 at each power rail VDD or VSS of the cell 602 is generated. During a rising transition at the output OUT of the cell 602, a current $I_{VDD}$ drawn from the power rail VDD includes a current that charges the loading capacitor $C_L$, and a short circuit current that flows directly from the power rail VDD to the power rail VSS. The current waveforms 706 and 708 are current transitions at the power rails VDD and VSS, respectively, during a falling transition at the input IN and a corresponding rising transition at the output OUT of the cell 602. In some embodiments, the current $I_{VDD}$ further includes a current in a direction from the output OUT to the input IN that charges the Miller capacitor between the input IN and the output OUT. During charging, the effect of Miller capacitor manifests itself as an extended tail portion located towards the end of a triangular-shaped portion of the signal waveform 706.

Symmetrically, during a rising transition at the input IN and a corresponding falling transition at the output OUT of the cell 602, a current $I_{VSS}$ flows into the power rail VSS includes a current that discharges the loading capacitor $C_L$, and a short circuit current that flows directly from the power rail VDD to the power rail VSS. The corresponding current waveforms of the currents $I_{VDD}$ and $I_{VSS}$ are not shown. In some embodiments, the current $I_{VSS}$ further includes a current in a direction from the input IN to the output OUT that discharges the Miller capacitor. During discharging, the effect of Miller capacitor manifests itself as an extended tail portion located towards the end of a triangular-shaped portion of the signal waveform of the current $I_{VSS}$.

Figure 7A:
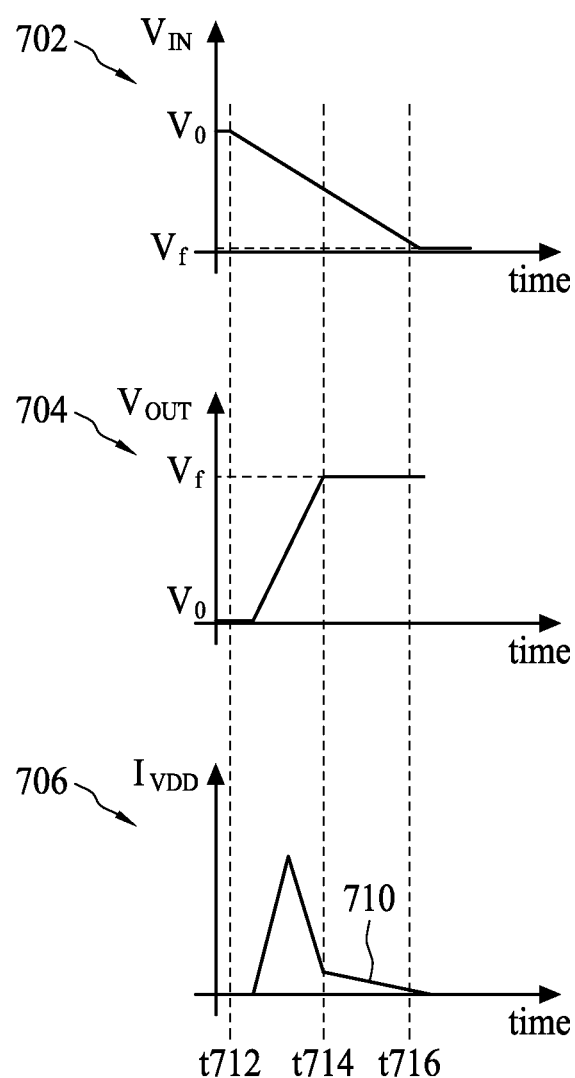

FIGS. 7A to 7C are schematic waveform diagrams illustrating definitions of SWs in accordance with different embodiments. In operation 506 in FIG. 5, for each cell, a respective SW of the cell 602 in FIG. 6 is obtained using the respective signal waveforms 702 and 704 at the one or more inputs IN and the output OUT of the cell 602. A SW of a cell is a period of time during which the cell is turned on and therefore conducts current.

In some embodiments in FIG. 7A, the SW of the cell 602 is a time window ($t_{712}$, $t_{714}$) in one clock cycle. The time $t_{712}$ is a time when the signal waveform 702 of the voltage $V_{IN}$ starts transitioning from a corresponding initial voltage $V_0$. The time $t_{714}$ is a time when the signal waveform 704 of the voltage $V_{OUT}$ finishes, for example, 99% of the transition from a corresponding initial voltage $V_0$ to a corresponding steady state voltage $V_f$. Depending on, for example, capacitance of the capacitors coupled to the input IN and the output OUT, the signal waveform 702 of the voltage $V_{IN}$ can reach the corresponding steady state voltage $V_f$ later than the voltage $V_{OUT}$ as shown in FIG. 7A, or vice versa. In some embodiments, the tail portion 710 of the current waveform 706 is contributed by the later of the voltage $V_{IN}$ and the voltage $V_{OUT}$ reaches the corresponding steady state voltage $V_f$. Therefore, by ending the switching window at the time $t_{714}$, the tail portion 710 of the current waveform 706 is not considered.

In other embodiments in FIG. 7A, the SW of the cell 602 is a time window ($t_{712}$, $t_{716}$) in one clock cycle. Compared to the time window ($t_{712}$, $t_{714}$), the time window ($t_{712}$, $t_{716}$) ends at the time $t_{716}$ when the later of the signal waveform 702 of the voltage $V_{IN}$, and the signal waveform 704 of the voltage $V_{OUT}$ finishes, for example, 99% of the transition from the corresponding initial voltage $V_0$ to the corresponding steady state voltage $V_f$. Hence, the tail portion 710 of the current waveform 706 is considered in this definition of the SW.

In the embodiments in FIGS. 7B and 7C, the time when the voltage $V_{IN}$ or the voltage $V_{OUT}$ starts transitioning, and a propagation delay of the cell 602 are uncertain. In FIG. 7B, the signal waveforms 722 of the voltage $V_{IN}$ include several signal waveforms 7222 and 7224 labeled at the corresponding legends of the signal waveforms 7222 and 7224 shown at the bottom of the figure. The signal waveform 7222 has the earliest possible arrival time and the signal waveform 7224 has the latest possible arrival time. The signal waveforms 724 of the voltage $V_{OUT}$ include several signal waveforms 7242, 7244, 7246 and 7248 labeled at the corresponding legends of the signal waveforms 7242, 7244, 7246 and 7248 shown at the bottom of the figure. The signal waveform 7242 is originated from the signal waveform 7222 having the earliest arrival time and a smallest possible propagation delay of the cell 602. The signal waveform 7248 is originated from the signal waveform 7224 having the latest arrival time and a largest possible propagation delay of the cell 602. The signal waveforms 7244 and 7246 are originated from the signal waveform 7222 with the earliest arrival time and the cell 602 having the largest propagation delay, and the signal waveform 7224 with the latest arrival time and the cell having the smallest propagation delay, respectively, or vice versa.

In the embodiments in FIG. 7B, the SW of the cell 602 is a time window ($t_{722}$, $t_{724}$) in one clock cycle. The time $t_{722}$ is a time when the signal waveform 7222 of the voltage $V_{IN}$ having the earliest arrival time finishes, for example, 50% of the transition from the corresponding initial voltage $V_0$ to the corresponding steady state voltage $V_f$. The time $t_{724}$ is a time when the signal waveform 7248 of the voltage $V_{OUT}$ that is originated from the signal waveform 7224 with the latest arrival time and the largest propagation delay of the cell 602 finishes, for example, 50% of the transition from the corresponding initial voltage $V_0$ to the corresponding steady state voltage $V_f$.

In the embodiments in FIG. 7C, the SW of the cell 602 is a time window ($t_{732}$, $t_{734}$) in one clock cycle. Compared to the SW of the cell 602 described with reference to FIG. 7B, the time $t_{734}$ is similar to the time $t_{724}$ but the time $t_{732}$ is calculated by subtracting the largest propagation delay D from the time $t_{734}$.

With respect to the embodiments in FIG. 7A, the uncertainty in the arrival time of the transitions in the voltage $V_{IN}$ and the voltage $V_{OUT}$ and the uncertainty in the propagation delay of the cell 602 described with reference to FIGS. 7B and 7C can be similarly applied.

Referring to FIG. 7A, in some embodiments, the method implementing operation 204 in FIG. 5 proceeds to the operation 206 in FIG. 2 after the operation 506, and the operation 206 uses the full current waveform 706 of the current $I_{VDD}$ during, for example, the SW ($t_{712}$, $t_{716}$) obtained from the method in FIG. 5 directly. In other embodiments, the method in FIG. 5 further performs the operation 508 after the operation 506. In operation 508, a current waveform characteristic of the current waveform 706 at the power rail VDD of the cell 602 is obtained. In some embodiments, the current waveform characteristic is a peak current of the current waveform 706 within, for example, the SW ($t_{712}$, $t_{716}$).

Figure 8:
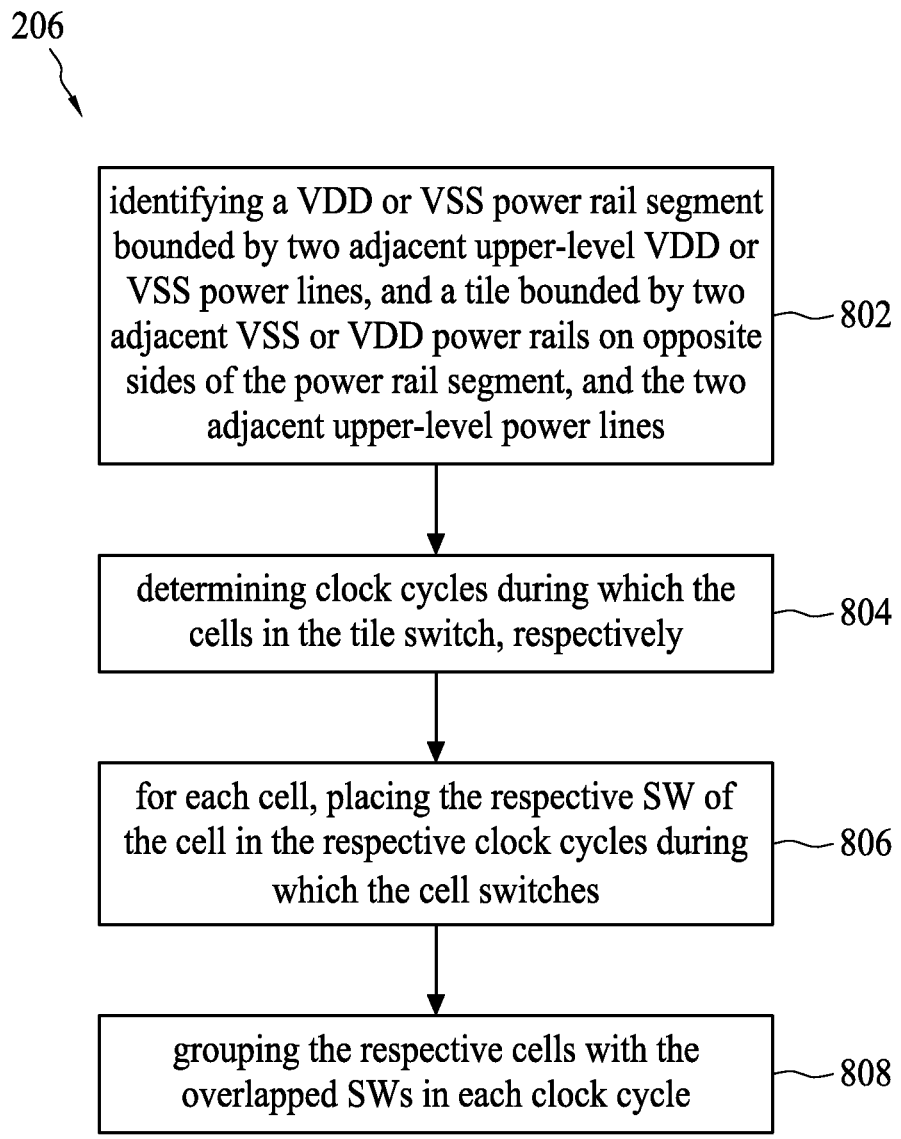
FIG. 8 is a flow diagram of a method implementing the operation 206 in FIG. 2 in accordance with some embodiments.

In operation 206 in FIG. 2, for the tile with the power rail segment in the design layout, one or more groups of cells with the overlapped SWs in the tile are determined. FIG. 8 is a flow diagram of a method implementing the operation 206 in FIG. 2 in accordance with some embodiments. In operation 802, a VDD or VSS power rail segment bounded by two adjacent upper-level VDD or VSS power lines is identified, and a tile bounded by two adjacent VSS or VDD power rails on opposite sides of the power rail segment and the two adjacent upper-level VDD or VSS power lines is identified. In operation 804, clock cycles during which the cells in the tile switch, respectively, are determined. In operation 806, for each cell, the respective SW of the cell is placed in the respective clock cycles during which the cell switches. In operation 808, in each clock cycle, the respective cells with the overlapped SWs are grouped.

Referring to FIG. 4, in operation 802 in FIG. 8, the VDD power rail segment 4122A bounded by the two adjacent upper-level VDD power lines 4322 and 4324 is identified, and a tile 440 bounded by two adjacent VSS power rails 4142 and 4144 on opposite sides of the VDD power rail segment 4122A and the two adjacent upper-level VDD power lines 4322 and 4324 is identified. The VDD power lines 4322 and 4324 cross over the VDD power rail 4122. At where the VDD power lines 4322 and 4324 intersect the VDD power rail 4122, vias 4222 and 4224 are disposed between the VDD power rail 4122 and the VDD power lines 4322 and 4324, respectively. As a result, a current flows from the VDD power line 4322 or 4324, the via 4222 or 4244, and the VDD power rail segment 4122A to the cells $S_1, S_2, \ldots,$ and $S_5$. The tile 440 has an upper boundary and a lower boundary across a pitch of the VSS power rails 4142 and 4144, and a left boundary and a right boundary across a pitch of the VDD power lines 4322 and 4324. The tile 440 encloses the cells $S_1, S_2, \ldots,$ and $S_5$ and the power rail segment 4122 supporting the cells $S_1, S_2, \ldots,$ and $S_5$.

Figure 9A:
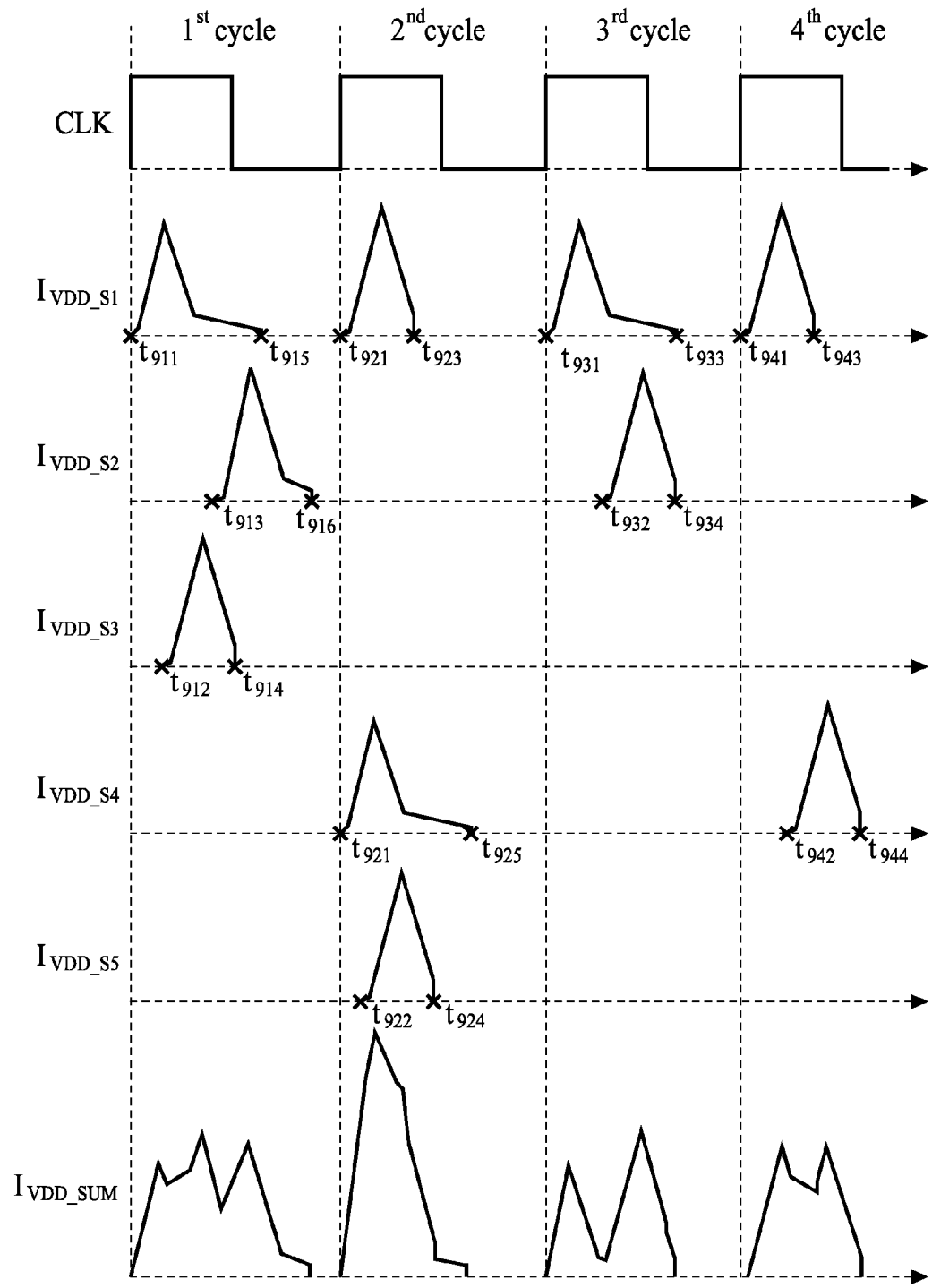
FIG. 9A is a schematic timing diagram generated from a simulation using input vectors and the current waveforms obtained from the operation 204 in FIG. 2 for obtaining the one or more EM usages of the power rail segment in accordance with some embodiments.

FIG. 9A is a schematic timing diagram generated from a simulation using input vectors and the current waveforms obtained from the operation 204 in FIG. 2 for obtaining the one or more EM usages of the power rail segment 4122A in FIG. 4 in accordance with some embodiments. In operation 804, clock cycles during which the cells $S_1, S_2, \ldots,$ and $S_5$ in the tile 440 in FIG. 4 switch, respectively, are determined. In order to determined the clock cycles during which the cells $S_1, S_2, \ldots,$ and $S_5$ switch, input vectors are provided to primary inputs of the physical netlist described with reference to the operation 502 in FIG. 5 or alternatively, primary inputs of the gate-level netlist described with reference to the IC design stage 102 in FIG. 1. The input vectors can have a length of, for example, 1000 clock cycles. In response to the input vectors, whether the cell $S_1, S_2, \ldots,$ or $S_5$ in the physical netlist or the gate-level netlist switches in each clock cycle, or in other words, has a signal transition at the output of the cell $S_1, S_2, \ldots,$ or $S_5$ in each clock cycle is determined by the simulation. In FIG. 9A, transitions in four clock cycles of a clock signal CLK are discussed as an example.

Referring to FIG. 9A, in operation 806 in FIG. 8, for each cell $S_1, S_2, \ldots,$ or $S_5$, the respective SW determined in the operation 204 in FIG. 2 is placed in the respective clock cycles during which the cell $S_1, S_2, \ldots,$ or $S_5$ switches. For example, based on the simulation performed in the operation 804, the cell $S_1$ switches from "0" to "1" in the $1^{st}$ cycle, from "1" to "0" in the $2^{nd}$ cycle and so on. In operation 804, the SW ($t_{911}$, $t_{915}$) for a rising transition at an output of the cell $S_1$ (corresponding to the row of $I_{VDD\_S1}$) is placed in the $1^{st}$ cycle, and the SW ($t_{921}$, $t_{923}$) for a falling transition at the output of the cell $S_1$ is placed in the $2^{nd}$ cycle. The SW ($t_{931}$, $t_{933}$) in the $3^{rd}$ cycle and the SW ($t_{941}$, $t_{943}$) in the $4^{th}$ cycle are the same as the SW ($t_{911}$, $t_{915}$) in the $1^{st}$ cycle, and the SW ($t_{921}$, $t_{923}$) in the $2^{nd}$ cycle, respectively. Based on the simulation, the cell $S_2$ switches from "0" to "1" in the $1^{st}$ cycle, and from "1" to "0" in the $3^{rd}$ cycle. The SW ($t_{913}$, $t_{916}$) for a rising transition at an output of the cell $S_2$ (corresponding to the row of $I_{VDD\_S2}$) is placed in the $1^{st}$ cycle, and the SW ($t_{932}$, $t_{934}$) for a falling transition at the output of the cell $S_2$ is placed in the $3^{rd}$ cycle. Similarly, the SW ($t_{912}$, $t_{914}$) for the cell $S_3$ (corresponding to the row of $I_{VDD\_S3}$) is placed in the $1^{st}$ cycle; the SW ($t_{921}$, $t_{925}$) and SW ($t_{942}$, $t_{944}$) for the cell $S_4$ (corresponding to the row of $I_{VDD\_S4}$) are placed in the $2^{nd}$ and the $4^{th}$ cycles, respectively. The SW ($t_{922}$, $t_{924}$) for the cell $S_5$ (corresponding to the row of $I_{VDD\_S5}$) is placed in the $2^{nd}$ cycle.

In operation 808 in FIG. 8, in each clock cycle, the respective cells with the overlapped SWs are grouped. In the example in FIG. 9A, in the $1^{st}$ cycle, the cells $S_1, S_2$ and $S_3$ have overlapped SWs ($t_{911}$, $t_{915}$), ($t_{913}$, $t_{916}$) and ($t_{912}$, $t_{914}$), and are grouped into a group G1. In the $2^{nd}$ cycle, the cells $S_1, S_4$ and $S_5$ have overlapped SWs ($t_{921}$, $t_{923}$), ($t_{921}$, $t_{925}$), and $(t_{922}, t_{924})$, and are grouped into a group G2. In the $3^{rd}$ cycle, the cells $S_1$ and $S_2$ have overlapped SWs $(t_{931}, t_{933})$ and $(t_{932}, t_{934})$, and are grouped into a group G3. In the $4^{th}$ cycle, the cells $S_1$ and $S_4$ have overlapped SWs $(t_{941}, t_{943})$ and $(t_{942}, t_{944})$, and are grouped into a group G4.

Referring to FIG. 9A, in operation 208 in FIG. 2, one or more EM usages of the power rail segment 4122A in FIG. 4 by the one or more groups of cells G1, G2, G3 and G4 are obtained. In some embodiments, in order to determine the EM usage of the power rail segment 4122A by the group G1, the current waveforms of the currents $I_{VDD\_S1}$, $I_{VDD\_S2}$, and $I_{VDD\_S3}$ corresponding to the types of transitions of the cells $S_1$, $S_2$ and $S_3$ in the $1^{st}$ cycle, respectively, and corresponding to the SWs $(t_{911}, t_{915})$, $(t_{913}, t_{916})$ and $(t_{912}, t_{914})$ in the $1^{st}$ cycle, respectively, are placed in the SWs $(t_{911}, t_{915})$, $(t_{913}, t_{916})$ and $(t_{912}, t_{914})$ in the $1^{st}$ cycle, respectively. Similarly, for the group G2, the corresponding current waveforms of the currents $I_{VDD\_S1}$, $I_{VDD\_S4}$, and $I_{VDD\_S5}$ during the SWs $(t_{921}, t_{923})$, $(t_{921}, t_{925})$, and $(t_{922}, t_{924})$ in the $2^{nd}$ cycle, respectively, are placed in the 2nd cycle. For the group G3, the corresponding current waveforms of the currents $I_{VDD\_S1}$, and $I_{VDD\_S2}$ during the SWs $(t_{931}, t_{933})$ and $(t_{932}, t_{934})$ in the $3^{rd}$ cycle, respectively, are placed in the $3^{rd}$ cycle. For the group G4, the corresponding current waveforms of the currents $I_{VDD\_S1}$, and $I_{VDD\_S4}$ during the SWs $(t_{941}, t_{943})$ and $(t_{942}, t_{944})$ in the $4^{th}$ cycle, respectively, are placed in the $4^{th}$ cycle.

In some embodiments, the EM usage of the power rail segment 4122A of one group of cells is a current waveform characteristic of a current waveform obtained by summing the current waveforms of the cells placed in the corresponding cycle. For example, the EM usage of the power rail segment 4122A by the group G1 is a current waveform characteristic of a current waveform of a current $I_{VDD\_SUM}$ in the $1^{st}$ cycle obtained by summing the current waveforms of the currents $I_{VDD\_S1}$, $I_{VDD\_S2}$ and $I_{VDD\_S3}$ in the $1^{st}$ cycle. Exemplary current waveform characteristics of a current waveform include a peak current and an RMS current. Similarly, the EM usage of the power rail segment 4122A by the group G2, G3 or G4 is a current waveform characteristic of a current waveform of the current $I_{VDD\_SUM}$ in the $2^{nd}$, $3^{rd}$ or $4^{th}$ cycle obtained by summing the current waveforms of the currents $I_{VDD\_S1}$, $I_{VDD\_S4}$ and $I_{VDD\_S5}$ in the $2^{nd}$ cycle, the current waveforms of the currents $I_{VDD\_S1}$ and $I_{VDD\_S2}$ in the $3^{rd}$ cycle, or the current waveforms of the currents $I_{VDD\_S1}$ and $I_{VDD\_S4}$ in the $4^{th}$ cycle.

Figure 9B:
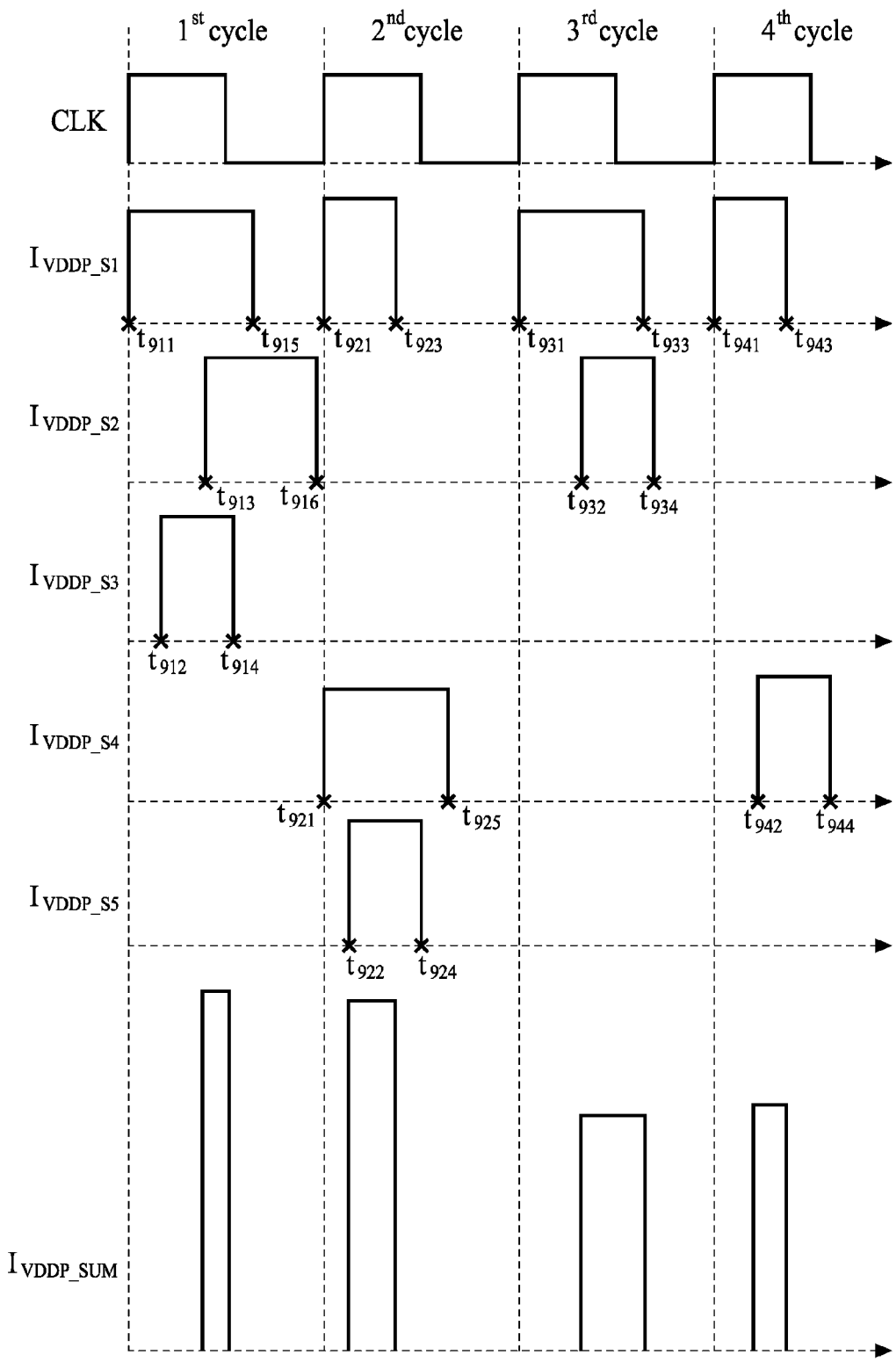
FIG. 9B is a schematic timing diagram generated from the simulation using the input vectors and the current waveform characteristics obtained from the operation 204 in FIG. 2 for obtaining the one or more EM usages of the power rail segment in accordance with other embodiments.

FIG. 9B is a schematic timing diagram generated from the simulation using the input vectors and the current waveform characteristics obtained from the operation 204 in FIG. 2 for obtaining the one or more EM usages of the power rail segment 4122A in accordance with other embodiments. Compared to the embodiments described with reference to FIG. 9A, in the operation 208 in FIG. 2, in order to determine, for example, the EM usage of the power rail segment 4122A by the group G1, the current waveform characteristics of the currents $I_{VDDP\_S1}$, $I_{VDDP\_S2}$, and $I_{VDDP\_S3}$ instead of the current waveforms of the currents $I_{VDDP\_S1}$, $I_{VDDP\_S2}$, and $I_{VDDP\_S3}$ are placed in the SWs $(t_{911}, t_{915})$, $(t_{913}, t_{916})$ and $(t_{912}, t_{914})$ in the $1^{st}$ cycle, respectively. The current waveform characteristic is, for example, a peak current during the SW. Similarly, for the group G2, the corresponding current waveform characteristics of the currents $I_{VDDP\_S1}$, $I_{VDDP\_S4}$, and $I_{VDDP\_S5}$ during the SWs $(t_{921}, t_{923})$, $(t_{921}, t_{925})$, and $(t_{922}, t_{924})$ in the $2^{nd}$ cycle, respectively, are placed in the $2^{nd}$ cycle. For the group G3, the corresponding current waveform characteristics of the currents $I_{VDDP\_S1}$, and $I_{VDDP\_S2}$ during the SWs $(t_{931},$ $t_{933})$ and $(t_{932}, t_{934})$ in the $3^{rd}$ cycle, respectively, are placed in the $3^{rd}$ cycle. For the group G4, the corresponding current waveform characteristics of the currents $I_{VDDP\_S1}$, and $I_{VDD\_S4}$ during the SWs $(t_{941}, t_{943})$ and $(t_{942}, t_{944})$ in the $4^{th}$ cycle, respectively, are placed in the $4^{th}$ cycle.

In addition, compared to the embodiments described with reference to FIG. 9A, the EM usage of the power rail segment 4122A of one group of cells is a current waveform characteristic obtained by summing the current waveform characteristics of the cells placed in the corresponding cycle. For example, the EM usage of the power rail segment 4122A by the group G1 is a current waveform characteristic $I_{VDDP\_SUM}$ in the $1^{st}$ cycle obtained by summing the current waveform characteristics $I_{VDDP\_S1}$, $I_{VDDP\_S2}$ and $I_{VDDP\_s3}$ in the $1^{st}$ cycle. The current waveform characteristic $I_{VDDP\_S1}$, $I_{VDDP\_S2}$ or $I_{VDDP\_S3}$ is, for example, a peak current during the SW of the cell $S_1$, $S_2$ or $S_3$ in the $1^{st}$ cycle. Similarly, the EM usage of the power rail segment 4122A by the group G2, G3 or G4, is the current waveform characteristic $I_{VDDP\_SUM}$ in the $2^{nd}$, $3^{rd}$ or $4^{th}$ cycle obtained by summing the current waveform characteristics $I_{VDDP\_S1}$, $I_{VDDP\_S4}$ and $I_{VDDP\_S5}$ in the $2^{nd}$ cycle, the current waveform characteristics $I_{VDDP\_S1}$ and $I_{VDDP\_S2}$ in the $3^{rd}$ cycle, or the current waveform characteristics $I_{VDDP\_S}$ and $I_{VDDP\_S4}$ in the $4^{th}$ cycle.

Obtaining the respective EM usage of the power rail segment by each group of cells to check whether any group violates an EM usage constraint is exemplary. Other ways such as obtaining a single EM usage of the power rail segment based on a peak current of all groups of cells to check whether the cells in the tile violate an EM usage constraint, and obtaining a single EM usage of the power rail segment based on an RMS current measured from a time period encompassing all groups of cells to check whether the cells in the tile violate an EM usage constraint are within the contemplated scope of the present disclosure. In addition, using the current waveform characteristic of the summed current waveforms of the group of cells or the summed current waveform characteristics of the group of cells to indicate the EM usage of the power rail segment is exemplary. Other characteristics, such as an average current, an average power or a peak power, obtained from the summed current waveforms or the summed current waveform characteristics are within the contemplated scope of the present disclosure.

In operation 210 in FIG. 2, whether one or more EM usages of any tile are not obtained is checked. Except for tiles similar to the tile 400 in FIG. 4 in the design layout 300 in FIG. 3, each tile bounded by two adjacent VDD power rails on opposite sides of a VSS power rail segment, and two adjacent upper-level VSS power lines is also identified in operation 206 in FIG. 2. Both the tiles with VDD power rail segments, and tiles with VSS power rail segments are checked by the operation 210.

In operation 212 in FIG. 2, placement optimization for the design layout 300 in FIG. 3 is performed such that each tile is under a respective EM usage constraint that limits the respective one or more EM usages by an EM susceptibility of the respective power rail segment. For example, to ensure an EM reliability of the power rail segment 4122A in FIG. 4, the one or more EM usages of the power rail segment 4122A in the tile 440 obtained in the operations 208 in FIG. 2 is constrained not to cause the EM susceptibility of the power rail segment 4122A. In some embodiments, the EM susceptibility of the power rail segment 4122A is a current limit determined using a width $W_{4122}$ of the power rail segment 4122A shown in FIG. 4 and an EM design rule. The EM design rule is based on, for example, a current density limit corresponding to a material and an operating temperature of the power rail segment 4122A. Exemplary current limits include a peak current limit, an RMS current limit and average current limit. In some embodiments, the placement optimization is solved similarly as a multi-bin packing problem.

By grouping the cells in accordance with whether the cells have overlapped SWs, the one or more EM usages of the power rail segment by the groups of cells obtained are less pessimistic than an EM usage obtained assuming all of the cells switch at the same time. Further, constraining the one or more EM usages by the groups of cells in the tile are more closely in relation to not violating the EM susceptibility of the power rail segment than constraining large-sized driver cells not to be placed in the same tile.

Figure 10:
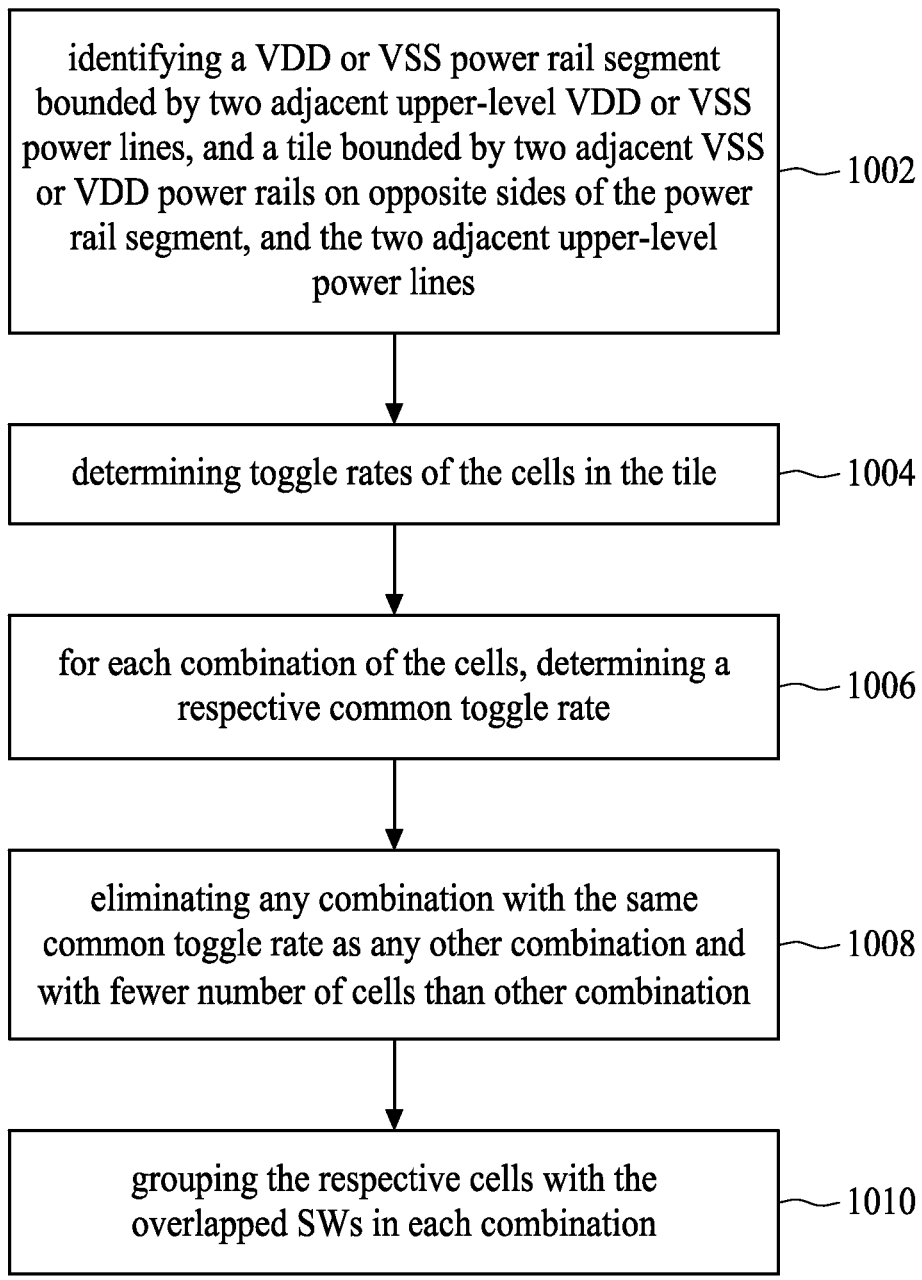
FIG. 10 is a flow diagram of a method implementing the operation 206 in FIG. 2 in accordance with other embodiments.

FIG. 10 is a flow diagram of a method implementing the operation 206 in FIG. 2 in accordance with other embodiments. The operation 206 in FIG. 2 determines the one or more groups of cells with the overlapped SWs in the tile 440 in FIG. 4. Compared to the method implementing the operation 206 in FIG. 8 which groups the cells based on the correspondence in the clock cycles during which the cells switch, the method in FIG. 10 groups the cells which has a common toggle rate. In operation 1002, a VDD or VSS power rail segment bounded by two adjacent upper-level power VDD or VSS lines is identified, and a tile bounded by two adjacent VSS or VDD power rails on opposite sides of the power rail segment and the two adjacent upper-level VDD or VSS power lines is identified. In operation 1004, toggle rates of the cells in the tile are determined. In operation 1006, for each combination of the cells, a respective common toggle rate is determined. In operation 1008, any combination with the same common toggle rate as any other combination and with a fewer number of cells than the other combination is eliminated. In operation 1010, the respective cells with the overlapped SWs in each combination are grouped. The operation 1002 is similar to the operation 802 described with reference to FIG. 4 and is omitted to be described here.

FIG. 11 illustrates results obtained from the operations 1004, 1006, and 1008 in accordance with some embodiments. As shown in a table 1102, in operation 1004, the toggle rates TR of the cells $S_1, S_2, \ldots,$ and $S_5$ in the tile 4122A are determined. A toggle rate of a cell is a rate at which an output of the cell changes with respect to a clock signal. For example, in FIG. 9A, the cell $S_1$ toggles every cycle of the clock signal CLK, and therefore has a TR of 1 in the table 1102. The cell $S_2$ toggles every other cycle, and has a TR of 0.5. The cell $S_3$ toggles every four cycles, and has a TR of 0.25. The cells $S_4$ and $S_5$ have TRs of 0.5 and 0.25, respectively.

As shown in a table 1104, in operation 1006, for each combinations of the cells, a respective common TR is determined. For example, for the cells $S_1, S_2, \ldots,$ and $S_5$, the following combinations can be formed: $\{S_1\}, \{S_2\}, \{S_3\}, \{S_4\}, \{S_5\}, \{S_1, \{S_2\}, \{S_1, S_3\}, \ldots,$ and $\{S_1, S_2, S_3, S_4, S_5\}$. The combination $\{S_1\}$ has a common TR of 1. The combinations $\{S_2\}, \{S_4\}, \{S_1\}, S_2\}, \ldots,$ and $\{S_1, S_2, S_4\}$ has common TRs of 0.5. The combinations $\{S_3\}, \{S_5\}, \{S_1, S_3\}, \ldots,$ and $\{S_1, S_2, S_3, S_4, S_5\}$ has common TRs of 0.25. The combinations listed in the table 1104 are exemplary.

In operation 1008, any combination with the same common TR as any other combination and with a fewer number of cells than the other combination is eliminated. For example, the combinations $\{S_1, S_2\}, \{S_1, S_4\}$ and $\{S_2, S_4\}$ has the same common TR as the combination $\{S_1, S_2, S_4\}$, and with fewer number of cells than the combination $\{S_1, S_2, S_4\}$. Therefore, the combinations $\{S_1, S_2\}, \{S_1, S_4\}$ and $\{S_2, S_4\}$ are eliminated. Therefore, the combinations left are the combination $\{S_1\}$ with the common TR of 1, the combination $\{S_1, S_2, S_4\}$ with the common TR of 0.5, and the combination $\{S_1, S_2, S_3, S_4, S_5\}$ with the common TR of 0.25.

In operation 1010, the respective cells with the overlapped SWs in each combination $\{S_1\}, \{S_1, S_2, S_3\}$ or $\{S_1, S_2, S_3, S_4, S_5\}$ are grouped. The manner with which the SWs of the cells in each combination are placed in a clock cycle to determine the overlapped SWs is similar to that described with reference to operation 808 in FIG. 8 and is omitted here.

Figure 12:
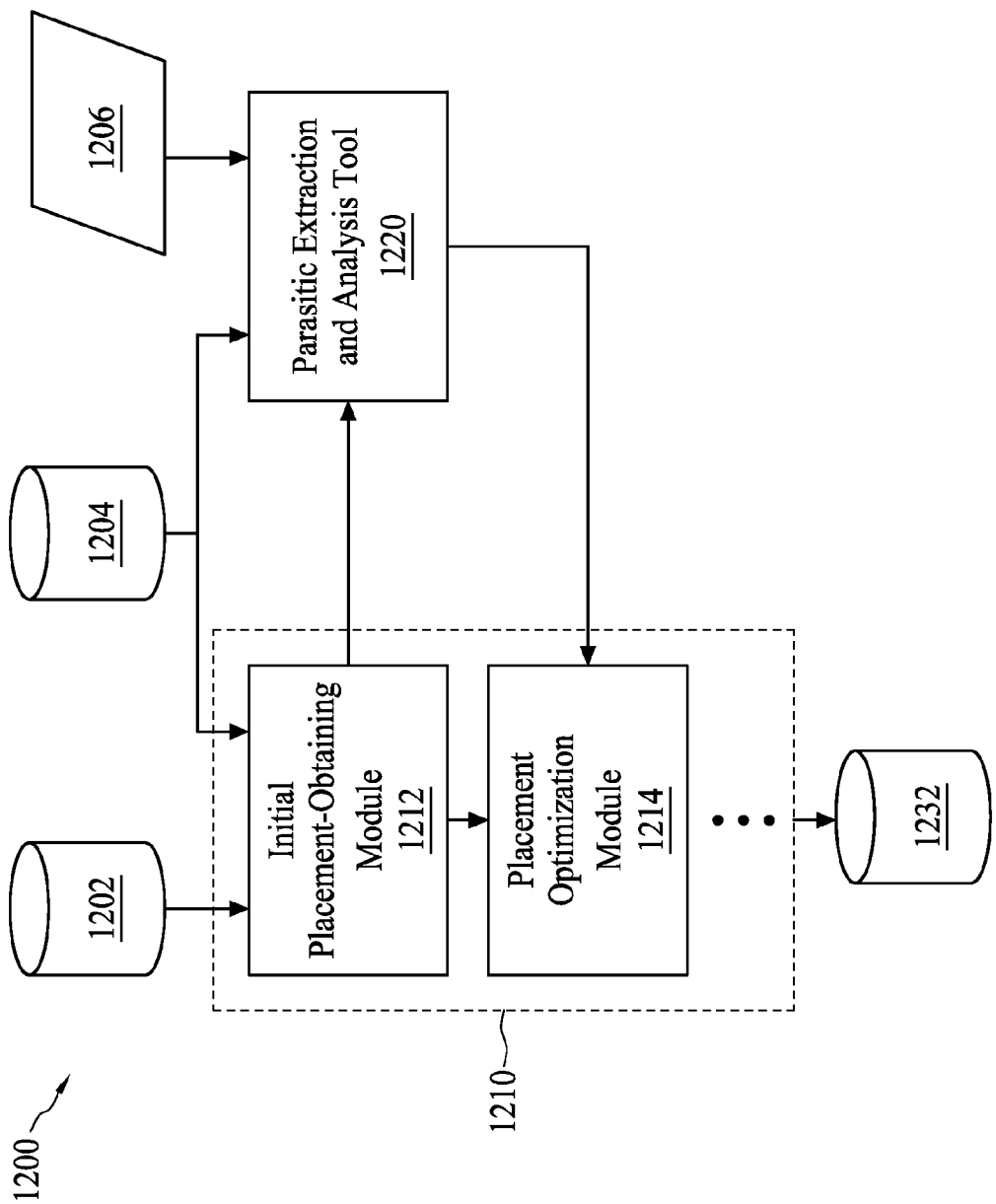
FIG. 12 is a functional block diagram of an EM-aware layout generation system in accordance with some embodiments.

FIG. 12 is a functional block diagram of an EM-aware layout generation system 1200 in accordance with some embodiments. In some embodiments, the system 1200 includes a place-and-route tool 1210 and a parasitic extraction and analysis tool 1220. In some embodiments, the place-and-route tool 1210 is employed at the placement stage 108 in FIG. 1 and the parasitic extraction and analysis tool 1220 is employed at the extraction and analysis stage 110. The place-and-and route tool 1210 includes an initial placement-obtaining module 1212 and a placement optimization module 1214. The initial placement-obtaining module 1212 is configured to receive a design layout 1202 from the power planning stage 106 in FIG. 1, and cell layouts in the standard cell library 1204, and generates an initial placement in the design layout 1202. Exemplary design layout 1202 with the initial placement has been described with reference to FIGS. 3 and 4. The parasitic extraction and analysis tool 1220 is configured to receive the design layout 1202 with the initial placement from the initial placement-obtaining module 1212, timing models and/or power models of cells in the standard cell library 1204, and input settings such as input vectors or toggle rates, and performs timing analysis and/or power analysis on a physical netlist generated from the design layout 1202. Take a power rail segment in the design layout as an example. In analysis results, a respective current through the power rail segment during a respective SW of the cell is obtained for each cell. In addition, one or more groups of cells with overlapped SWs are determined. The placement optimization module 1214, receives the design layout 1202 with the initial placement from the placement-obtaining module 1212 and the analysis results from the parasitic extraction and analysis tool 1220, and obtains one or more EM usages of the power rail segment by the groups of cells with the overlapped SWs using the respective currents of each group of cells. Further, the placement optimization module 1214 optimizes the design layout when any of the one or more EM usages of the power rail segment causes an EM susceptibility of the power rail segment and the optimized design layout are passed to subsequent modules for generating a placed-and-routed design layout 1232.

Figure 13:
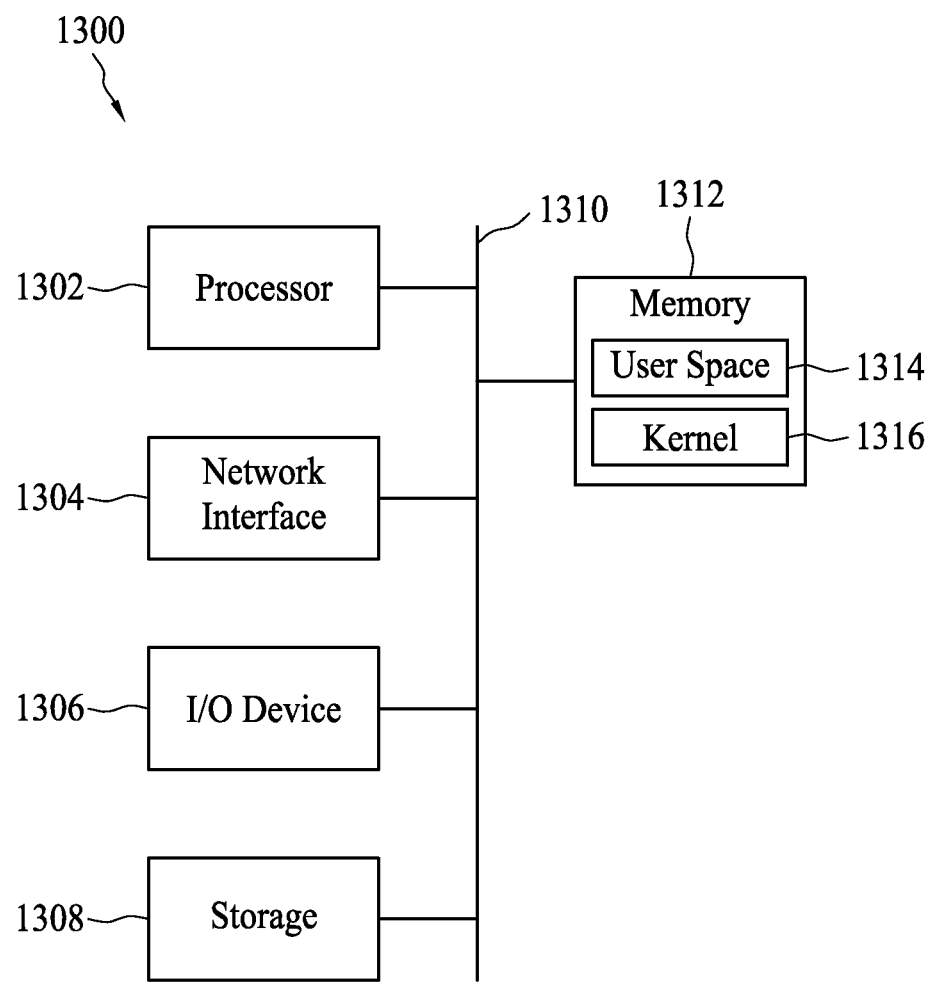
FIG. 13 is a block diagram of a hardware system for implementing the method embodiments described with reference to FIG. 2 and the software system embodiments described with references to FIG. 12 in accordance with some embodiments.

FIG. 13 is a block diagram of a hardware system 1300 for implementing the method embodiments described with reference to FIG. 2 and the software system embodiments described with references to FIG. 12 in accordance with some embodiments. The system 1300 includes at least one processor 1302, a network interface 1304, an input and output (I/O) device 1306, a storage 1308, a memory 1312, and a bus 1310. The bus 1310 couples the network interface 1304, the I/O device 1306, the storage 1308 and the memory 1312 to the processor 1302.

In some embodiments, the memory 1312 comprises a random access memory (RAM) and/or other volatile storage device and/or read only memory (ROM) and/or other non-volatile storage device. The memory 1312 includes a kernel 1316 and user space 1314, configured to store program instructions to be executed by the processor 1302 and data accessed by the program instructions.

In some embodiments, the network interface 1304 is configured to access program instructions and data accessed by the program instructions stored remotely through a network. The I/O device 1306 includes an input device and an output device configured for enabling user interaction with the system 1300. The input device comprises, for example, a keyboard, a mouse, etc. The output device comprises, for example, a display, a printer, etc. The storage device 1308 is configured for storing program instructions and data accessed by the program instructions. The storage device 1308 comprises, for example, a magnetic disk and an optical disk.

In some embodiments, when executing the program instructions, the processor 1302 is configured to as method embodiments described with reference to FIG. 2 and software system embodiments described with references to FIG. 12.

In some embodiments, the program instructions are stored in a non-transitory computer readable recording medium such as one or more optical disks, hard disks and non-volatile memory devices.

Some embodiments have one or a combination of the following features and/or advantages. In some embodiments, one or more EM usages of a power rail segment by one or more groups of cells with overlapped SWs are determined. The one or more EM usages of the power rail segment are constrained not to cause an EM susceptibility of the power rail segment during placement optimization. By grouping the cells in accordance with whether the cells have overlapped SWs, the one or more EM usages of the power rail segment by the groups of cells obtained are less pessimistic than an EM usage obtained assuming all of the cells switch at the same time. Further, constraining the one or more EM usages by the groups of cells in the tile are more closely in relation to not violating the EM susceptibility of the power rail segment than constraining large-sized driver cells not to be placed in the same tile.

In some embodiments, in a method performed by at least one processor, placement of a design layout is performed by the at least one processor. The design layout includes a power rail segment, a plurality of upper-level power lines and a plurality of cells. The plurality of upper-level power lines cross over and bound the power rail segment at where the upper-level power lines intersect with the power rail segment. The plurality of cells are powered through the power rail segment. For each cell, a respective first current through the power rail segment during a respective switching window (SW) of the cell is obtained by the at least one processor. One or more groups of cells with overlapped SWs are determined by the at least one processor. One or more electromigration (EM) usages of the power rail segment by the one or more groups of cells with the overlapped SWs using the respective first currents of each group of cells are obtained by the at least one processor. The design layout is adjusted by the at least one processor when any of the one or more EM usages of the power rail segment causes an EM susceptibility of the power rail segment.

In some embodiments, a system includes at least one processor and at least one memory. The at least one processor is configured to execute program instructions which configure the at least one processor as a place-and-route tool and a parasitic extraction and analysis tool. The at least one memory is configured to store the program instructions. The place-and-route tool performs placement of a design layout. The design layout includes a power rail segment, plurality of upper-level power lines and a plurality of cells. The plurality of upper-level power lines cross over and bound the power rail segment at where the upper-level power lines intersect with the power rail segment. The plurality of cells are powered through the power rail segment. The parasitic extraction and analysis tool obtains, for each cell, a respective first current through the power rail segment during a respective switching window (SW) of the cell. The parasitic extraction and analysis tool determines one or more groups of cells with overlapped SWs. The place-and-route tools obtains one or more electromigration (EM) usages of the power rail segment by the groups of cells with the overlapped SWs using the respective first currents of each group of cells. The place-and-route tool adjusts the design layout when any of the one or more EM usages of the power rail segment causes an EM susceptibility of the power rail segment.

In some embodiments, in a method performed by at least one processor, a design layout is received by the at least one processor. The design layout includes a first tile. The first tile includes a plurality of cells supported by a power rail segment in the first tile. For each cell in the first tile, a respective first current through the power rail segment during a respective switching window (SW) of the cell is received by the at least one processor. One or more groups of cells with overlapped SWs are determined by the at least one processor. One or more electromigration (EM) usages of the power rail segment by the groups of cells with the overlapped SWs using the respective first currents of each group of cells are obtained by the at least one processor. The design layout is adjusted by the at least one processor when any of the one or more EM usages of the power rail segment causes an EM susceptibility of the power rail segment.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, performed by at least one processor, comprising:
   performing, by the at least one processor, placement of a design layout, the design layout comprising:
      a first network comprising:
         a power rail segment; and
         a plurality of upper-level power lines crossing over and bounding the power rail segment at where the upper-level power lines intersect with the power rail segment; and
      a plurality of cells powered through the power rail segment;
   for each cell of the plurality of cells, obtaining, by the at least one processor, a respective first current of the cell through the power rail segment during a respective switching window (SW) of the cell;
   determining, by the at least one processor, one or more groups of cells of the plurality of cells with respective overlapped SWs;

obtaining, by the at least one processor, one or more electromigration (EM) usages of the power rail segment respectively by the one or more groups of cells, using the respective first currents of each group of cells of the one or more groups of cells and without considering a matrix of electrical characteristics obtained for determining currents in the first network;

adjusting, by the at least one processor, the design layout when any of the one or more EM usages of the power rail segment causes an EM susceptibility of the power rail segment; and initiating generation of an integrated circuit chip from the design layout based on the performing, the determining, the obtaining and the adjusting.

2. The method of claim 1, wherein the respective first current of each cell of a first group cells of the one or more groups of cells is a first current waveform, the EM usage by the first group of cells is a current waveform characteristic of a second current waveform obtained by summing the respective first current waveforms of the first group of cells, and the EM susceptibility is a limit on the current waveform characteristic.

3. The method of claim 1, wherein the respective first current of each cell of a first group of cells of the one or more groups of cells is a first current waveform characteristic, the EM usage by the first group of cells is a second current waveform characteristic obtained by summing the respective first current waveform characteristics of the first group of cells, and the EM susceptibility is a limit on the second current waveform characteristic.

4. The method of claim 1, wherein determining the one or more groups of cells of the plurality of cells with the respective overlapped SWs comprises:
in one or more first clock cycles, determining respective one or more second clock cycles during which each cell of the plurality of cells switch;
for each cell of the plurality of cells, placing the respective SW of the cell in the respective one or more second clock cycles during which the cell switches; and
forming each group of cells of the one or more group of cells by grouping, for a respective clock cycle of the one or more first clock cycles and of the group, respective cells of the plurality of cells and of the respective clock cycle with the respective overlapped SWs of the group.

5. The method of claim 1, wherein determining the one or more groups of cells of the plurality of cells with the respective overlapped SWs comprises:
determining a respective toggle rate of each cell of the plurality of cells;
for each combination of the plurality of cells, determining a respective common toggle rate;
eliminating any combination of the plurality of cells with the same common toggle rate as any other combination of the plurality of cells and with fewer number of cells than the other combination; and
forming each group of cells of the one or more group of cells by grouping, for a respective not eliminated combination of the plurality of cells, cells of the respective not eliminated combination of the plurality of cells with the respective overlapped SWs of the group.

6. The method of claim 1, wherein the SW of a first cell of the plurality of cells is defined using a time when a signal at an input of the first cell starts transitioning, and a time when the later of a respective signal at each input of the first cell and a signal at an output of the first cell finishes transitioning.

7. The method of claim 1, wherein the SW of a first cell of the plurality of cells is defined using a time when a signal at an output of the first cell reaching a predetermined percentage of a transition of the signal and a propagation delay of the first cell.

8. A system, comprising:
at least one processor, configured to execute program instructions which configure the at least one processor as a place-and-route tool and a parasitic extraction and analysis tool that perform operations comprising:
performing, by the place-and-route tool, placement of a design layout, the design layout comprising:
a first network comprising:
a power rail segment; and
a plurality of upper-level power lines crossing over and bounding the power rail segment at where the upper-level power lines intersect with the power rail segment; and
a plurality of cells power through the power rail segment;
for each cell of the plurality of cells, obtaining, by the parasitic extraction and analysis tool, a respective first current of the cell through the power rail segment during a respective switching window (SW) of the cell;
determining, by the parasitic extraction and analysis tool, one or more groups of cells of the plurality of cells with respective overlapped SWs;
obtaining, by the place-and-route tool, one or more electromigration (EM) usages of the power rail segment respectively by the one or more groups of cells, using the respective first currents of each group of cells of the one or more groups of cells and without considering a matrix of electrical characteristics obtained for determining currents in the first network; and
adjusting, by the place-and-route tool, the design layout when any of the one or more EM usages of the power rail segment causes an EM susceptibility of the power rail segment;
at least one memory configured to store the program instructions; and
a tape-out tool configured to initiate generation of an integrated circuit chip from the design layout based on the performing, the determining, the obtaining and the adjusting.

9. The system of claim 8, wherein the respective first current of each cell of a first group cells of the one or more groups of cells is a first current waveform, the EM usage by the first group of cells is a current waveform characteristic of a second current waveform obtained by summing the respective first current waveforms of the first group of cells, and the EM susceptibility is a limit on the current waveform characteristic.

10. The system of claim 8, wherein the respective first current of each cell of a first group of cells of the one or more groups of cells is a first current waveform characteristic, the EM usage by the first group of cells is a second current waveform characteristic obtained by summing the respective first current waveform characteristics of the first group of cells, and the EM susceptibility is a limit on the second current waveform characteristic.

11. The system of claim 8, wherein the parasitic extraction and analysis tool determines the one or more groups of cells of the plurality of cells with the respective overlapped SWs by performing operations comprising:
    in one or more first clock cycles, determining respective one or more second clock cycles during which each cell of the plurality of cells switch;
    for each cell of the plurality of cells, placing the respective SW of the cell in the respective one or more second clock cycles during which the cell switches; and
    forming each group of cells of the one or more group of cells by grouping, for a respective clock cycle of the one or more first clock cycles and of the group, respective cells of the plurality of cells and of the respective clock cycle with the respective overlapped SWs of the group.

12. The system of claim 8, wherein the parasitic extraction and analysis tool determines the one or more groups of cells of the plurality of cells with the respective overlapped SWs by performing operations comprising:
    determining a respective toggle rate of each cell of the plurality of cells;
    for each combination of the plurality of cells, determining a respective common toggle rate;
    eliminating any combination of the plurality of cells with the same common toggle rate as any other combination of the plurality of cells and with fewer number of cells than the other combination; and
    forming each group of cells of the one or more group of cells by grouping, for a respective not eliminated combination of the plurality of cells, cells of the respective not eliminated combination with the respective overlapped SWs of the group.

13. The system of claim 8, wherein the SW of a first cell of the plurality of cells is defined using a time when a signal at an input of the first cell starts transitioning, and a time when the later of a respective signal at each input of the first cell and a signal at an output of the first cell finishes transitioning.

14. The system of claim 8, wherein the SW of a first cell of the plurality of cells is defined using a time when a signal at an output of the first cell reaching a predetermined percentage of a transition of the signal and a propagation delay of the first cell.

15. A method, performed by at least one processor, comprising:
    receiving, by the at least one processor, a design layout, the design layout comprising a plurality of first tiles,
        each first tile of the plurality of first tiles comprising a respective plurality of cells supported by a respective power rail segment in and extended across a boundary of the first tile, and
        the respective power rail segments of the plurality of first tiles being non-selectively electrically connected;
    for each cell of the respective plurality of cells in each first tile of the plurality of first tiles, receiving, by the at least one processor, a respective first current of the cell through the respective power rail segment of the first tile during a respective switching window (SW) of the cell;
    for each first tile of the plurality of first tiles, determining, by the at least one processor, one or more groups of cells of the respective plurality of cells of the first tile, each group of the one or more groups of cells being with respective overlapped SWs;
    for each first tile of the plurality of first tiles, obtaining, by the at least one processor, one or more electromigration (EM) usages of the respective power rail segment of the first tile respectively by the one or more groups of cells of the respective plurality of cells of the first tile, using the respective first currents of each group of cells of the one or more groups of cells and without considering the respective first currents of each group of cells of the one or more groups of cells of any other first tile in the plurality of first tiles;
    adjusting, by the at least one processor, the design layout when any of the one or more EM usages of the respective power rail segment of each first tile of the plurality of first tiles causes an EM susceptibility of the respective power rail segment; and
    initiating generation of an integrated circuit chip from the design layout based on the receiving; for each cell of the respective plurality of cells in each first tile of the plurality of first tiles, the receiving; for each first tile of the plurality of first tiles, the determining; for each first tile of the plurality of first tiles, the obtaining; and the adjusting.

16. The method of claim 15, wherein the respective first current of each cell of a first group of cells of the one or more groups of cells of the plurality of cells of a second tile of the plurality of first tiles is a first current waveform, the EM usage by the first group of cells is a current waveform characteristic of a second current waveform obtained by summing the respective first current waveforms of the first group of cells, and the EM susceptibility of a first power rail segment of the second tile is a limit on the current waveform characteristic.

17. The method of claim 15, wherein the respective first current of each cell of a first group of cells of the one or more groups of cells of the plurality of cells of a second tile of the plurality of first tiles is a first current waveform characteristic, the EM usage by the first group of cells is a second current waveform characteristic obtained by summing the respective first current waveform characteristics of the first group of cells, and the EM susceptibility of a first power rail segment of the second tile is a limit on the second current waveform characteristic.

18. The method of claim 15, wherein for each first tile of the plurality of first tiles, determining the one or more groups of cells of the respective plurality of cells of the first tile comprises:
    in one or more first clock cycles, determining respective one or more second clock cycles during which each cell of the respective plurality of cells switches;
    for each cell of the respective plurality of cells, placing the respective SW of the cell in the respective one or more second clock cycles during which the cell switches; and
    forming each group of cells of the one or more group of cells by grouping, for a respective clock cycle of the one or more first clock cycles and of the group, respective cells of the respective plurality of cells and of the respective clock cycle with the respective overlapped SWs of the group.

19. The method of claim 15, wherein for each first tile of the plurality of first tiles, determining the one or more groups of cells of the respective plurality of cells of the first tile comprises:
    determining a respective toggle rate of each cell the respective plurality of cells;
    for each combination of the respective plurality of cells, determining a respective common toggle rate;
    eliminating any combination of the respective plurality of cells with the same common toggle rate as any other combination of the respective plurality of cells and with fewer number of cells than the other combination; and forming each group of cells of the respective one or more group of cells by grouping, for a respective not eliminated combination of the respective plurality of cells, cells of the respective not eliminated combination with the respective overlapped SWs of the group.

20. The method of claim 15, wherein the SW of a first cell of the plurality of cells of a second tile of the plurality of first tiles is defined using a time when a signal at an input of the first cell starts transitioning, and a time when the later of a respective signal at each input of the first cell and a signal at an output of the first cell finishes transitioning.

* * * * *